United States Patent [19]

Blanton et al.

[11] Patent Number: 5,626,976
[45] Date of Patent: May 6, 1997

[54] FLEXIBLE ENERGY STORAGE DEVICE WITH INTEGRAL CHARGING UNIT

[75] Inventors: Gerald W. Blanton, Flowery Branch; Simon Thomas, Lawrenceville, both of Ga.; Kenneth M. Massaroni, Plantation, Fla.

[73] Assignee: Motorola, Inc., Schaumburg, Ill.

[21] Appl. No.: 506,159

[22] Filed: Jul. 24, 1995

[51] Int. Cl.$^6$ .................................................. H01M 12/00
[52] U.S. Cl. .................................. 429/9; 136/291; 320/2; 340/311.1; 364/705.01; 379/433; 379/457
[58] Field of Search .................... 429/9; 136/291; 320/2; 340/311.1; 364/705.01; 379/433, 457

[56] References Cited

U.S. PATENT DOCUMENTS

| | | | |
|---|---|---|---|
| 4,481,265 | 11/1984 | Ezawa et al. | 429/9 |
| 4,816,082 | 3/1989 | Guha et al. | 136/249 |
| 5,012,220 | 4/1991 | Miller | 340/311.1 |
| 5,260,885 | 11/1993 | Ma | 364/708.1 |

FOREIGN PATENT DOCUMENTS

| | | | |
|---|---|---|---|
| 0108492 | 5/1984 | European Pat. Off. | 136/291 |
| 9011989.4 | 12/1990 | Germany | 136/291 |

*Primary Examiner*—Aaron Weisstuch
*Attorney, Agent, or Firm*—Kenneth M. Massaroni

[57] ABSTRACT

A flexible, conformal energy storage device (10) has a plurality of photovoltaic devices (40, 42, 44) formed integrally therewith. The energy source includes an anode, a cathode, and an electrolyte encapsulated between layers of oxygen and water impermeable sealing materials. The sealing materials also serve as the base upon which the photovoltaic devices are deposited. The anode and cathode of the photovoltaic devices are electrically coupled to the anode and the cathode of the energy storage device to provide a recharging current thereto.

11 Claims, 2 Drawing Sheets

FLEXIBLE ENERGY STORAGE DEVICE WITH INTEGRAL CHARGING UNIT

TECHNICAL FIELD

This invention relates in general to energy storage devices, and in particular to rechargeable energy storage devices for portable electronic devices having integrally formed units for recharging said devices.

BACKGROUND OF THE INVENTION

Consumer markets continue to request smaller, portable electronic devices which have greater functional features. Examples of such devices include two-way and broadcast radio receivers, compact disc players, cellular telephones, and computer devices, to name but a few. As portable electronic devices have become smaller, the demand for smaller energy sources, such as batteries, to power such devices has increased. Obviously very small energy storage devices, such as an electrochemical battery cell, may be fabricated for a given electrical device, but compactness comes at the cost of energy capacity. Accordingly, for many high power applications the energy source is too bulky, too heavy, or doesn't last long enough.

One limiting feature of current battery cells is the packaging of the electrochemical system. The current convention is to house the electrodes and electrolyte in a cylindrical or square (prismatic) steel can. This form of packaging is widely commercially available. In the past this has forced designers to design electrical products around the cells, rather than design the product the way they would prefer, adding the energy source later.

Further, as the physical size of batteries decreases (to meet size requirements of product designers), the capacity of the battery is reduced. This results in device users needing many batteries if they anticipate being away from a battery charging device for extended periods of time. Alternatively, users may carry portable, high speed, charging devices with them. This however is unacceptable, due to the additional weight associated with the charging device.

To address this problem, many devices now include battery chargers formed integrally therewith. These systems avoid the problems associated with carrying a discrete charging device, however still require the user to carry a charging cord, and have access to a power source, such as a wall plug. Alternatively, and under appropriate conditions, energy sources such as photovoltaic cells may be incorporated into the housing of electronic devices. A common example of such a device is battery powered walk lights which are commercially available. Such devices include a conventional battery in a steel can, which is electrically interconnected to a photovoltaic cell for recharging. The drawback to this approach is that the design of the walk light is constrained by both the size and shape limitations of the cell can, and the requirements for a large, flat area for the photovoltaic cell.

Accordingly, what is needed is a means to reduce the bulkiness of the energy source, such as a battery, necessary for use with small, electronic devices. The energy source should be small, conformal, relatively flexible, and able to provide an appropriate housing for the electronic device associated therewith. The energy source should also include an integrally formed recharging device, which is free from the limitations of the prior art.

DETAILED DESCRIPTION OF THE PREFERRED EMBODIMENT

Figure 1:
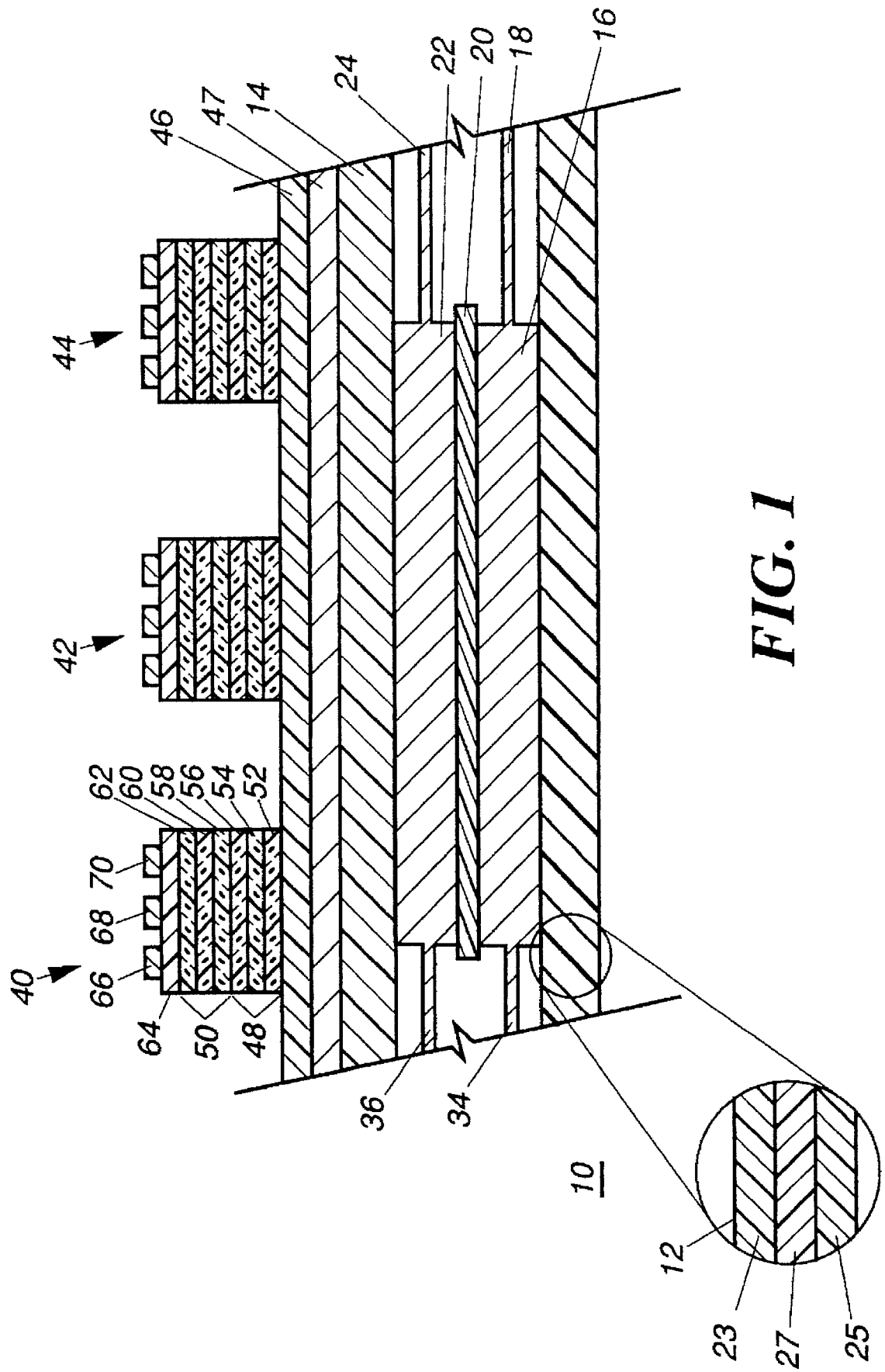
FIG. 1 is a side view of an energy storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1 there is illustrated therein side view of an electrochemical energy storage device 10 including integrally formed photovoltaic cells for charging said charge storage device, in accordance with the instant invention. The electrochemical charge storage device 10 comprises a first and second polymeric packaging films 12, 14, first battery electrode 16, first battery current collector 18, electrolyte 20, second battery electrode 22, and second battery current collector 24. The first polymeric packaging film 12 and second polymeric packaging film 14 are fabricated of a polymeric material having a water vapor permeability of preferably less than about 1.3 g/m$^2$ day where day for water vapor transmission measurement is defined as 1 atmosphere pressure, one mm thick film, and 95% relative humidity. The material should also have an oxygen gas permeability of preferably less than 46.5 ml/m$^2$ day where day for oxygen vapor transmission measurement is defined as 1 atmosphere pressure, one mm thick film, and 75% relative humidity.

The polymeric packaging films may be fabricated of a number of different materials, examples of which include polyimides such as kapton, or Ultem, and other similar material. Alternatively, the films 12 and 14 may be multi-layered structures. These multi-layered structures are formed by co-extruding two or more polymers to make a packaging film having desired properties. It will occur to one of ordinary skill in the art to place multiple layers of such films atop one another in order to build a thicker device appropriate for a particular application.

Co-extrusion is a one-step process and is well known in the art as a process for forming sheets of polymeric material. The multi-layered structures from which films 12, 14, are fabricated may be three-layered structures in which the first and third layers 23 and 25 are fabricated of polyethylene or polypropylene which can each be co-extruded with any of the following materials: poly(vinylidene)chloride, polyester, fluorocarbon resin, polyvinyl chloride, poly(vinylidene) chloride-methacrylate, and combinations thereof. The first and third layers encapsulate or sandwich a second layer 27 fabricated of, for example, a layer of poly(vinylidene) chloride, to form a sheet of packaging film. Other polymers may be employed as layer 27 to impart a desired property to the film. The film is then cut into the required size and shape for a particular application.

The films define a package perimeter by the outer edges of the films. Further, the films are of the same size and shape, and thus correspond to each other when stacked vertically one atop the other. The first battery electrode 16 is disposed adjacent to the first layer of polymeric packaging material, on the side thereof between the two packaging films. The first battery electrode is sized and shaped such that it is smaller than the first layer of polymeric packaging material. The first battery current collector 18 is attached to the first battery electrode 16, and has at least one portion extending beyond the package perimeter defined by the first polymeric packaging film. The current collector thereby defines a first tab 34, for electrically coupling the energy storage device 10 with the device which it is designed to power.

Disposed over the first battery electrode 16 is an electrolyte 20 which is either an aqueous or non-aqueous electrolyte or a polymer gel electrolyte material. Alternatively, the electrolyte may be a solid state electrolyte. Electrolytes selected for use in the instant application are known in the art and may be readily practiced by those of ordinary skill. The electrolyte is disposed so that no portion of the first electrode is visible, i.e., the first electrode is completely covered by the electrolyte with the first tab extending outwardly from underneath the electrolyte.

The second battery electrode 22 is disposed on the electrolyte 20, is preferably the same size and shape as first electrode, and is positioned such that it corresponds with first battery electrode. First and second electrodes are made of different electrochemically active materials, so as to provide a voltage potential. Appropriate pairs of such materials are known in the art and include nickel-cadmium systems, nickel-metal hydride systems, lithium ion, lithium polymer, and lead-acid to name a few. A second battery current collector 24 is attached to the second electrode and has at least one portion extending beyond the package perimeter, thereby forming a second tab 36. The second tab, like first tab 34, is adapted to function as the terminal for attaching the energy storage device to an electronic device to be powered. Flexible, conformal energy storage devices, and methods for making same, are fully disclosed in commonly assigned, co-pending U.S. patent application Ser. No. 04/494,463 filed Jun. 26, 1995, in the names of Louie, et al and entitled PACKAGING FOR AN ELECTROCHEMICAL DEVICE AND DEVICE USING SAME, the disclosure of which in incorporated herein by reference.

Disposed atop the second polymeric packaging film 14 is a plurality of photovoltaic devices which are electrically interconnected to the electrochemical charge storage device. Hence, the photvoltaic devices and the charge storage device are integrally formed as a single unit, and are not discrete components as in prior art devices. The photovoltaic devices 40, 42, 44 may be fabricated of any of a number of different materials, as are commonly known in the photovoltaic art, and are preferably fabricated of alternating layers of n-doped, intrinsic, and p-doped amorphous silicon in a manner well known in the art.

More specifically, photovoltaic devices 40, 42, 44 are formed on a current collecting layer 46 preferably fabricated of a transparent, conductive oxide such as indium, indium oxide, tin oxide, indium tin oxide, cadmium stannate, and combinations thereof. The current collecting layer 46 is disposed on a back reflecting layer 47 which may be formed of a metal selected from the group of aluminum, copper, silver, gold, nickel, stainless steel, and combinations thereof. The back reflecting layer is disposed upon one of the layers of the packaging film, and maximizes the amount of light passing through the photovoltaic devices by reflecting any unabsorbed light back through the devices. It also provides the additional advantage of enhanced oxygen and vapor barrier characteristics which may be necessary in addition to those provided by the polymeric packaging film. Thus, the back reflecting layer may be used to make the battery waterproof at elevated pressures. The thickness of the layer 47 is generally in the range of 5–25 microns and preferably about 10 microns. It will however occur to those of ordinary skill in the art that thicknesses outside this range may be used without a loss of performance.

Each of photovoltaic devices 40, 42, 44 are substantially identical; hence only device 40 will be described in detail.

It is to be further understood that while only three photovoltaic devices are illustrated in FIG. 1, any number of such devices may be arranged atop the polymeric packaging film. Photovoltaic device 40 is comprised of two discrete photovoltaic cells 48, 50 arranged in a stacked configuration. It is to be understood that three or more such stacked devices may be arranged in stacked configuration, and advantageously employed. The bandgap of each cell is tailored such that each cell is responsive to different wavelengths of light, in a manner well known in the art.

Each discrete cell is fabricated of successive layers of n-doped, intrinsic, and p-doped amorphous semiconductor material, such as amorphous silicon, germanium, silicon alloys, germanium alloys, and combinations thereof. Hence, discrete cells 48 and 50 each include a first layer of doped amorphous semiconductor material 52, 58, a layer of substantially intrinsic semiconductor material 54, 60 disposed thereover; and disposed atop each intrinsic layer is a second layer of doped amorphous silicon material 56, 62, said second layers being doped differently than said first doped layers. Thus, if first layers are p-doped, the second doped layers are n-doped.

Disposed atop uppermost doped layer 62 is a second current collecting layer 64, preferably formed of a layer of transparent conducting oxide such as that disclosed above in reference to layer 46. An electrode current collecting grid with grid fingers 66, 68, 70 may be added atop layer 64 where the photovoltaic cells are of sufficiently large size, or if the conductivity of the layer 64 is insufficient. The grid is adapted to shorten the carrier path and increase the conductive efficiency of photogenerated charge carriers. Fabrication of amorphous silicon photovoltaic devices is well known in the art, and is fully described in, for example, U.S. Pat. No. 4,816,082, to Guha, et al, entitled "Thin Film Solar Cell Including a Spatially Modulated Intrinsic Layer," the disclosure of which is incorporated herein by reference.

Current collecting layers 46 and 64 (and the grid if present) are electrically coupled to battery electrodes 16, 22 so that any electrical current photogenerated by the photovoltaic devices are applied as recharge current to the battery electrodes. It will thus be appreciated that the current collecting layer at the cathode of the photovoltaic devices will be electrically coupled to the cathode of the battery, while the current collecting layer at the anode of the photovoltaic devices will be electrically coupled to the anode of the battery, all in a manner well known in the art.

Figure 2:
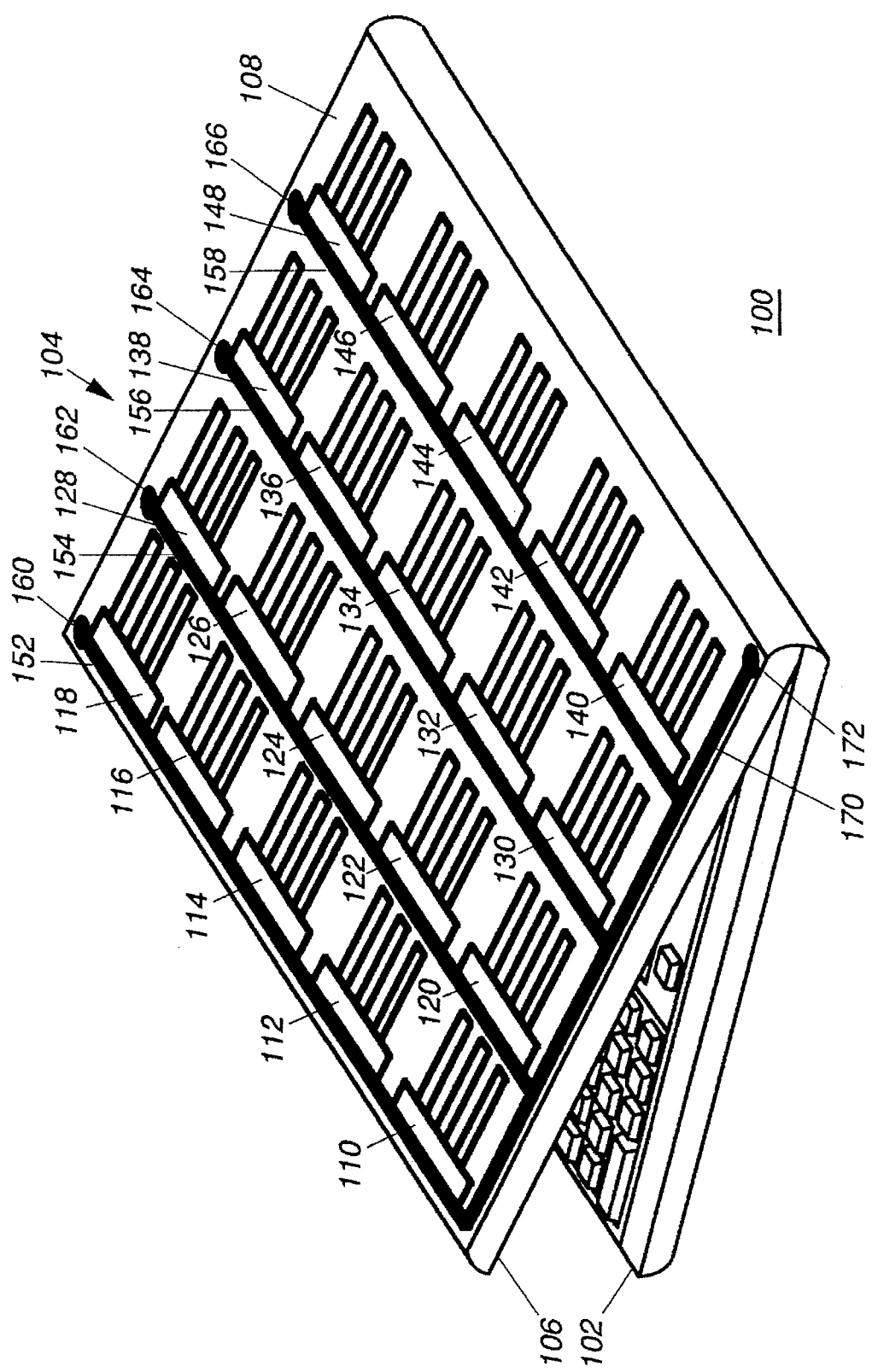
FIG. 2 is a perspective view of an energy storage device having a recharging device integrally formed therewith.

Referring now to FIG. 2, there is illustrated therein a perspective view of an electronic device 100 such as a palmtop computer, having the device of FIG. 1 incorporated therein. It is to be understood that while the device illustrated in FIG. 2 is a palmtop computer, the invention is not so limited. Indeed, the electronic device may be any electronic device including, for example, a cellular telephone, a pager, a computer, or a personal digital assistant, to name but a few.

The device 100 includes a work surface 102 such as a keyboard. Pivotally mounted to the work surface is a cover member 104 having first and second major surfaces 106, 108. As is common in portable computer applications, a display, such as a liquid crystal display (not shown) may be mounted on first surface 106. The second surface of the cover may be fabricated of the energy storage device described hereinabove in FIG. 1. Indeed, due to the flexible, conformal nature of the energy storage device of FIG. 1, the entire cover may be fabricated of the energy storage device.

Accordingly, as illustrated in FIG. 2, second surface 108 includes four rows of five photovoltaic cells each providing 20 cells 110, 112, 114, 116, 118, 120, 122, 124, 126, 128, 130, 132, 134, 136, 138, 140, 142, 144, 146, 148. The current collecting grid of each individual cell may be electrically coupled to a current collecting strip to carry current from the cells to the energy storage device. Hence, each row includes current carrying strip 152, 154, 156, 158. Cells 120, 122, 124, 126 and 128 are coupled to strip 152. Each current carrying strip may then be connected to the energy storage device as described above, through plated holes or vias 160, 162, 164, 166, which are further adapted to prevent ambient condition from invading the energy storage devices. Alternatively, each strip may be connected to a single conductive lead 170, which is coupled to the energy storage device at via 172. As may be appreciated, the entire housing of any electronic device may thus be fabricated of the energy storage device described herein. Of course, the current limits of commercially available photovoltaic devices limit the applicability of such a device to relatively low power, low current applications, examples of which include pagers and palm top computers. However, as photovoltaic technology improves, higher power applications will become practical.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A flexible energy storage device comprising:

first and second sheets of flexible polymeric sealing materials enclosing a flexible battery device comprising a battery anode and a battery cathode and having an electrolyte material disposed therebetween; and at least one flexible photovoltaic device having an anode and a cathode, and disposed on a layer of metallic reflecting material deposited on the outer surface of one of said first or second sheets of polymeric sealing materials, said battery anode being electrically coupled to said photovoltaic device anode, and said battery cathode being electrically coupled to said photovoltaic device cathode; and wherein said layer of reflecting material renders said one layer of polymeric sealing materials substantially liquid and vapor impermeable.

2. A flexible energy storage device as in claim 1, wherein said sheets of polymeric sealing materials are fabricated of a polyimide.

3. A flexible energy storage device as in claim 1, wherein said sheets of polymeric sealing materials are fabricated as a multilayered material.

4. A flexible energy storage device as in claim 3, wherein said multilayered polymeric material is a three layered material.

5. A flexible energy storage device as in claim 4, wherein said three layered material further includes first and third layers consisting of polyethylene coextruded and encapsulating a second layer selected from the group consisting of polyvinylidene chloride, polyester, fluorocarbon resin, polyvinyl chloride, polyvinylidene chloride-methacrylate, and combinations thereof.

6. A flexible energy storage device as in claim 4, wherein said three layered material further includes first and third layers consisting of polypropylene coextruded and encapsulating a second layer selected from the group consisting of polyvinylidene chloride, polyester, fluorocarbon resin, polyvinyl chloride, polyvinylidene chloride-methacrylate, and combinations thereof.

7. A flexible energy storage device as in claim 1, wherein said at least one photovoltaic device is fabricated of amorphous silicon.

8. A flexible energy storage device as in claim 1, wherein said energy storage device is fabricated into the housing of an electronic device.

9. A flexible energy storage device as in claim 8, wherein said electronic device is a pager.

10. A flexible energy storage device as in claim 8, wherein said electronic device is a cellular phone.

11. A flexible energy storage device as in claim 8 wherein said electronic device is a portable computer.

* * * * *